United States Patent [19]

Oberressl et al.

[11] Patent Number: 5,576,397
[45] Date of Patent: Nov. 19, 1996

[54] ACID-MODIFIED POLYESTERS AND THEIR USE IN STOVING ENAMELS

[75] Inventors: Paul Oberressl, Wiesbaden; Joachim Zoeller, Mainz, both of Germany

[73] Assignee: Hoechst Aktiengesellschaft, Germany

[21] Appl. No.: 389,324

[22] Filed: Feb. 16, 1995

Related U.S. Application Data

[63] Continuation of Ser. No. 201,211, Feb. 24, 1994, abandoned.

[30] Foreign Application Priority Data

Feb. 26, 1993 [DE] Germany ............... 43 05 990.2

[51] Int. Cl.⁶ ........................................ C08G 63/20
[52] U.S. Cl. ................. 525/444; 525/437; 525/448; 528/302; 528/296
[58] Field of Search ................... 528/302, 296; 525/437, 448, 444

[56] References Cited

U.S. PATENT DOCUMENTS

| | | | |
|---|---|---|---|
| 3,749,758 | 7/1973 | Gannou | 528/110 |
| 3,833,529 | 9/1974 | Albers | 528/302 |
| 4,910,292 | 3/1990 | Blount | 528/272 |

FOREIGN PATENT DOCUMENTS

| | | |
|---|---|---|
| 57-061021 | 4/1982 | Japan. |
| 58-189261 | 4/1983 | Japan. |
| 1048893 | 11/1966 | United Kingdom. |

*Primary Examiner*—Patricia A. Short
*Attorney, Agent, or Firm*—Bierman and Muserlian

[57] ABSTRACT

Acid-modified polyesters obtained by reacting
  (a) from 20 to 60, preferably 30–50, mol % of at least one dicarboxylic acid,
  (b) from 3 to 30, preferably 5–20, mol % of a dihydroxyalkanecarboxylic acid,
  (c) from 10 to 60, preferably 20–50, mol % of a diol,
  (d) from 0 to 30 mol % of a polyalcohol having more than two OH groups or of a polycarboxylic acid, and
  (e) from 0 to 20, preferably up to 10, mol % of a monocarboxylic acid,
the ratio of the sum of the hydroxyl equivalents to the sum of the carboxyl equivalents in the reactants being between 0.5 and 2.0, the quantities of free hydroxyl groups in the end product being between 30 and 350 mmol of hydroxyl groups per 100 g of solid resin, preferably between 100 and 250 mmol of hydroxyl groups per 100 g of solid resin, and the content of free, neutralized and/or neutralizable acid groups being between 5 and 350 mmol of acid groups per 100 g of solid resin, preferably between 9 and 120 mmol of acid groups per 100 g of solid resin.

9 Claims, No Drawings

5,576,397

ACID-MODIFIED POLYESTERS AND THEIR USE IN STOVING ENAMELS

PRIOR APPLICATION

This application is a continuation of U.S. patent application Ser. No. 201,211 filed Feb. 24, 1994, now abandoned.

The invention relates to aqueous dispersions of binders based on oil-free polyesters, to a process for their preparation and to their use for the production of storing enamels.

Aqueous polyester dispersions are becoming increasingly important in a wide variety of applications, as an increasing significance is given to the reduction of solvent emissions. Polyester binders in aqueous formulation are known, but have not yet become established in the packaging industry.

For instance, EP 498 156 and EP 140 323 describe polyesters, containing urethane groups, for storing enamels, and EP 427 028, EP 158 099 and EP 157 291 describe polyesters which contain urethane groups and whose aqueous dispersions also contain emulsifiers. DE 37 26 956 describes a coating composition for storing enamels, containing the reaction product of a polyester with urea and/or dicyandiamide, and DE 35 37 855 describes a polyester containing polyetherpolyols and an acrylate resin, which is used as a storing enamel. EP 113 800 describes alkyd resin mixtures in which polyetherpolyols are incorporated by condensation. EP 54 216 and U.S. Pat. No. 4,054,614 describe polyesters for storing enamels, which are rendered water-dispersible by reacting a polyester with dicarboxylic acid anhydrides. EP 9 122 describes a polyester dispersion containing secondary or tertiary carboxyl groups and 3–15% of emulsifier. EP 364 331 and DE 25 16 305, furthermore, describe polyesters for storing enamels, which carry sulfonate groups in order to confer water-solubility.

Great demands are placed on stoving enamels for the packaging industry (can and coil coating) and especially on can coatings. For instance, the dried films are intended simultaneously to be of great hardness and high elasticity. In addition, further important criteria are a good color fastness and yellowing resistance and adequate storage stability. The most difficult to achieve, however, is the extreme water resistance or steam resistance which is required in sterilization processes. Consequently, it is above all the required steam resistance during sterilization that the previously known aqueous polyesters fail to achieve.

It has now been found that aqueous coating compositions based on specific, water-dispersible polyesters do not have these disadvantages. The polyesters described below are distinguished by their good storage stabilities, good color fastnesses, high elasticity accompanied by great hardness, and, in particular, by their very good steam resistance. A further advantage is the very large storing range (130°–200° C.) in which it is possible to obtain films with equally good properties.

The present invention therefore relates to acid-modified polyesters obtained by reacting (a) from 20 to 60, preferably 30–50, mol % of at least one dicarboxylic acid, (b) from 3 to 30, preferably 5–20, mol % of a dihydroxyalkanecarboxylic acid, (c) from 10 to 60, preferably 20–50, mol % of a diol, (d) from 0 to 30 mol % of a polyalcohol having more than two OH groups or of a polycarboxylic acid, and (e) from 0 to 20, preferably up to 10, mol % of a monocarboxylic acid, the ratio of the sum of the hydroxyl equivalents to the sum of the carboxyl equivalents in the reactants being between 0.5 and 2.0, the quantities of free hydroxyl groups in the end product being between 30 and 350 mmol of hydroxyl groups per 100 g of solid resin, preferably between 100 and 250 mmol of hydroxyl groups per 100 g of solid resin, and the content of free, neutralized and/or neutralizable acid groups being between 5 and 350 mmol of acid groups per 100 g of solid resin, preferably between and 120 mmol of acid groups per 100 g of solid resin.

The dicarboxylic acid component (a) of the polyester is composed of saturated or unsaturated aliphatic, aromatic or cycloaliphatic dicarboxylic acids and dimeric fatty acids or of mixtures of two or more of these dicarboxylic acids. Examples of these dicarboxylic acids are oxalic, malonic, glutaric, adipic, pimelic, azelaic, sebacic, succinic, fumaric, maleic and itaconic acid, 1,3-cyclopentanedicarboxylic acid, 1,2-cyclohexanedicarboxylic acid, 1,3-cyclohexanedicarboxylic acid, 1,4-cyclohexanedicarboxylic acid, phthalic, terephthalic and isophthalic acid, 2,5-norbornanedicarboxylic acid, 1,4-naphthalenedicarboxylic acid, biphenyldicarboxylic acid, 4,4'-sulfonyldibenzoic acid and 2,5-naphthalenedicarboxylic acid, and esters or anhydrides thereof.

Preferred dicarboxylic acid components (a) are phthalic, isophthalic and terephthalic acid, phthalic anhydride, adipic and succinic acid, succinic anhydride, dimeric fatty acids, sebacic and azelaic acid, 1,3-cyclohexanedicarboxylic acid and glutaric acid and esters thereof.

Component (b) of the polyester to be described is a dihydroxyalkanecarboxylic acid, for example dimethylolpropionic acid, dihydroxypropionic acid, dihydroxysuccinic acid and dihydroxyhexanoic acid. Dimethylolpropionic acid is particularly preferred.

The diol component (c) may be composed of low molecular weight aliphatic, cycloaliphatic or aromatic diols having preferably from 2 to 24 carbon atoms in the molecule. Possible examples of the diols are ethylene glycol, 1,2-propanediol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, 1,2-cyclohexanedimethanol, 1,3-cyclohexanedimethanol, 1,4-cyclohexanedimethanol, perhydrogenated bisphenols, e.g. perhydro-bisphenol A, p-xylylenediol, and 2-ethyl- or 2-butylpropanediol.

Examples which may be mentioned of the more highly functional component (d), which contains from 3 to preferably 6 hydroxyl or carboxyl groups, are trimethylolpropane, trimethylolethane, glycerol, ditrimethylolpropane, pentaerythritol, dipentaerythritol, trimellitic anhydride, pyromellitic anhydride and polyanhydrides as described in DE 28 11 913, or mixtures of two or more of these compounds, the proportion of the more highly functional component (d) being preferably from 5 to 30 mol %, in particular from 8 to 20 mol %.

The monofunctional carboxylic acids (e) are predominantly fatty acids having preferably from 10 to 18 carbon atoms such as capric acid, lauric acid, stearic acid, linoleic acid, linolenic acid, oleic acid, linseed oil fatty acid and palmitic acid, although branched carboxylic acids such as isovaleric acid and isooctanoic acid may also be employed.

The polyesters are prepared by subjecting the stated components to a polycondensation reaction, known per se, which is carried if desired in the presence of customary esterification catalysts and preferably in accordance with the principle of a melt condensation or azeotropic condensation, at temperatures from about 140° to 260° C. with the removal of water.

In order to approach or achieve quantitative cocondensation, it may be necessary to carry out the synthesis of the polyesters in a multi-step process. For instance, it is possible first to prepare a OH-functional polyester which is then condensed with the dihydroxyalkanecarboxylic acid and a further dicarboxylic acid to give the desired polyester.

The reaction takes place at temperatures of between 140° C. and 260° C., preferably between 160° C. and 220° C. To avoid losses of diol, the condensate is distilled via a distillation column. Preferred catalysts are organometallic compounds, especially compounds containing zinc, tin or titanium, such as zinc acetate, dibutyltin oxide or tetrabutyl titanate. The amount of catalyst is preferably from 0.01 to 1.5% by weight of the total reaction mixture.

The number-average molecular weight of the polyester resin, determined experimentally by means of gel permeation chromatography, may be between 500 and 5000 g/mol and is preferably from 1000 to 3500 g/mol.

The acid groups may be introduced into the polyester in an already neutralized form via the individual components; if free acid groups are present in the finished polyester, then they can be neutralized subsequently using aqueous solutions of alkali metal hydroxides or using amines, for example trimethylamine, triethylamine, dimethylaniline, diethylaniline, triphenylamine, dimethylethanolamine, aminomethylpropanol or dimethylisopropanolamine, or using ammonia. The polyester may be isolated as a solid, but it is preferred to prepare it as a 50 to 95% strength solution in a water-miscible organic solvent. Suitable solvents in this respect are preferably those containing oxygen, such as alcohols, ketches, esters and ethers; examples are ethanol, n-propanol, isopropanol, isobutanol, butyl acetate and butylglycol, or nitrogen-containing solvents such as N-methylpyrrolidone. The viscosity of these solutions at 60° C. is preferably between 0.5 and 40 Pa s.

To prepare the aqueous dispersions the neutralized polyester resins, or their solutions in water-miscible solvents, are dispersed in water possibly by simply stirring water into the polyester resins using conventional dissolvers or other suitable stirring apparatus, or else by pouring the resins into water with vigorous stirring. It is possible if desired first to add a portion of the water and then to pour this mixture, with stirring, into the remaining amount of water. Inverse dispersion of the resin can also be carried out. In this way, stable oil-in-water emulsions are obtained. The amount of water is calculated such that the finished dispersion contains preferably from 15 to 65% by weight of polyester, from 0 to 30% by weight of organic solvents and from 35 to 85% by weight of water. The pH is adjusted to values of from 2 to 8.5, preferably from 4 to 8.

The aqueous binder composition as claimed generally comprises, based on the overall formulation, from 5 to 40 and preferably from 15 to 30% by weight of polyester resin. In addition to the polyester resin, the aqueous binder dispersion may additionally contain, as binder, a further proportion of up to 60 and preferably up to 30% by weight, based on the polyester resin, of other oligomeric or polymeric materials such as crosslinkable, water-soluble or water-dispersible phenolic resins, polyurethane resins, epoxy resins or acrylic resins, for example as described in EP-A 89 497.

Suitable crosslinking agents are the hardeners which are conventional for polyester resins, provided they are compatible with water. Examples which may be mentioned here are water-compatible (water-soluble or water-dispersible) amino resins, especially commercially available etherified melamine-formaldehyde condensates such as hexamethoxymethylmelamine, phenolic resins or blocked polyisocyanates, for example as described in DE-A 36 44 372.

The quantity of crosslinking agent is conventionally from 10 to 35% by weight, preferably from 15 to 25% by weight, based on the sum of crosslinking agent and binder to be crosslinked. The aqueous binder composition according to the invention, whose pH may be adjusted by adding amines, for example triethylamine, dimethylethanolamine, diethanolamine and triethanolamine, such that it is in the range from 6.0 to 10.0, preferably from 6.8 to 8.5, may also contain the conventional paint additives, such as pigments and fillers, and coating auxiliaries, for example anti-settling agents, antifoams and/or wetting agents, leveling agents, reactive diluents, plasticizers, catalysts, auxiliary solvents, thickeners and the like. At least some of these additives may be added to the binder composition only directly before processing. The selection of the nature and quantity of these substances which can be added to the individual components and/or to the overall mixture is known to those skilled in the art. Examples of pigments are iron oxides, lead oxides, lead silicates, titanium dioxide, barium sulfate, zinc oxide, zinc sulfide and phthalocyanine complexes etc., and examples of fillers are mica, kaolin, chalk, ground quartz, ground asbestos, ground slate, various silicic acids, silicates and talc, including so-called microtalc, having a maximum particle fineness of 10 μm (cf. EP-A 249 727). These pigments and/or fillers are conventionally employed in amounts of from 10 to 70% by weight, preferably from 30 to 50% by weight, based on the total solids content of the binder composition.

For environmental reasons, further auxiliary solvents, for example ethers such as dimethyl(diethyl)glycol, dimethyl(diethyl)diglycol, and tetrahydrofuran, ketones such as methyl ethyl ketone, acetone and cyclohexanone, esters such as butyl acetate, ethylglycol acetate, methylglycol acetate and methoxypropyl acetate, and alcohols such as ethanol, propanol and butanol are used—if at all—only in minimal amounts which generally do not exceed 10 and preferably 5% by weight based on water (as the principal diluent). The amount of water in the aqueous binder composition is generally from 15 to 80% by weight, preferably from 30 to 60% by weight, based on the overall binder composition.

The aqueous binder composition is prepared by the customary methods for preparing coatings, as is evident, for example, from the guideline formulation given below.

The application of the aqueous binder compositions, which are infinitely dilutable with water and whose total solids content (determined by drying at 125° C. for 2 hours) is in general from 30 to 75 and preferably from 35 to 60% by weight, is carried out in a known manner, for example by roller coating or by means of airless or electrostatic spraying. The temperatures generally employed to harden the applied coating films are from 120 to 200° C., preferably from 130° to 190° C. The duration of hardening is generally from 1 to 30 minutes, preferably 10 minutes, and shock drying is also possible.

The resulting crosslinked coatings are distinguished in particular by improved deformability and by very good sterilization resistance. They also possess good color fastness.

EXAMPLES

Polyester synthesis is carried out in a 4 l four-neck flask fitted with a packed column (column: 30 mm in diameter, 2000 mm in length; packing: glass rings 6 mm in diameter and 6 mm in length) and a descending distillation bridge, with temperature control of the reaction material under a protective gas atmosphere (protective gas feed, nitrogen). If low-boiling alcohols, especially methanol, are to be distilled off as condensate, the receiving vessel should be cooled with an ice bath.

Polyester 1

Step 1: 520 g of neopentylglycol and 200 g of trimethylolpropane are melted, and 360 g of terephthalic acid, 260 g of isophthalic acid and 1.3 g of dibutyltin oxide are added. The mixture is heated such that the overhead temperature does not exceed 100° C. Condensation is carried out at from 160° to 210° C. until the content of acid groups achieved is 10 mmol of acid per 100 g of solid resin.

Step 2: The mixture is cooled to 140° C., 400 g of adipic acid and 100 g of dimethylolpropionic acid are added, and the mixture is heated so that the overhead temperature does not exceed 100° C. Condensation is carried out at temperatures of up to 205° C. until a value of 55 mmol of acid per 100 g of solid resin is achieved. The mixture is then cooled to 80° C. and 300 g of butylglycol are added.

Polyester 2

Step 1: 520 g of neopentylglycol and 250 g of trimethylolpropane are melted, and 400 g of terephthalic acid, 360 g of isophthalic acid, 230 g of stearic acid and 1.8 g of dibutyltin oxide are added. The mixture is then heated such that the overhead temperature does not exceed 100° C., and condensation is carried out at from 190° C. to 200° C. until the content of acid groups achieved is 10 mmol of acid per 100 g of solid resin.

Step 2: The mixture is cooled to 140° C., 280 g of adipic acid and 150 g of dimethylolpropionic acid are added, and the mixture is heated such that the overhead temperature does not exceed 100° C. Condensation is carried out at temperatures of up to 210° C., until a value of 55 mmol of acid per 100 g of solid resin is achieved. The mixture is then cooled to 80° C. and 300 g of butylglycol are added.

Polyester 3

Step 1: 300 g of neopentylglycol, 250 g of hexanediol and 250 g of trimethylolpropane are melted, and 480 g of terephthalic acid, 380 g of isophthalic acid, 150 g of lauric acid and 1.3 g of dibutyltin oxide are added. The mixture is then heated such that the overhead temperature does not exceed 100° C. Condensation is carried out at from 190° to 220° C. until the content of acid groups achieved is 10 mmol of acid per 100 g of solid resin.

Step 2: The mixture is cooled to 140° C., 200 g of adipic acid and 150 g of dimethylolpropionic acid are added, and the mixture is heated such that the overhead temperature does not exceed 100° C. Condensation is carried out at temperatures of up to 205° C. until a value of 55 mmol of acid per 100 g of solid resin is achieved. The mixture is then cooled to 80° C. and 330 g of butylglycol are added.

Dispersions are prepared, using the polyesters from Examples 1, 2 and 3, in accordance with the following formulations:

Dispersions

D 1

1000 g of the polyester (1–3) are heated to 70° C. with stirring. 30 g of N,N-dimethylethanolamine are added dropwise over a period of 10 min. After the mixture has been stirred for 30 min, 630 g of deionized water heated to 80° C. are added dropwise. The storage stability of the dispersions is more than 4 months at 25° C.

D 2

1000 g of the polyester (1–3) are heated to 70° C. with stirring. 30 g of N,N-dimethylethanolamine are added dropwise over a period of 10 min. After the mixture has been stirred for 15 min, 215 g of deionized water heated to 70° C. are added. This solution is then poured with stirring into 415 g of deionized water heated to 50° C. The mixture is stirred for one hour and cooled to room temperature to obtain a bluish, almost clear dispersion.

The storage stability of the dispersions is more than 4 months at 25° C.

Guideline formulation for exterior packaging paints 64.0 parts of binder (dispersion of polyester 1 according to formulation 2, and of polyesters 2 and 3 according to formulation 1) were dispersed with 6 parts of a commercially available melamine-formaldehyde condensate, 27.20 parts of titanium dioxide, 1.25 parts of butylglycol and 1.55 parts of the customary coating auxiliaries in a bead mill (20 min, at about 20 m/s peripheral speed).

The exterior packaging paint is applied using a spiral applicator to tin-plated steel (can metal E1) and sheet aluminum. The coating is hardened in a circulating-air oven at 180° C. for 10 minutes. The resulting film thicknesses are about 5 µm.

The test results are compiled in the following Table. The resistance values (sterilization resistance in water, deformability, gloss, solvent resistance) correspond to those expected in practice.

| Dispersion of polyester according to formulation | 1<br>D2 | 2<br>D1 | 3<br>D1 |
|---|---|---|---|
| on aluminum | | | |
| Film thickness, µm | 5 | 5 | 5 |
| Crosshatch rating | 0 | 0 | 0 |
| Gloss, 60° angle | 90% | 90% | 70% |
| Deformability | | | |
| 1st drawing | OK | OK | OK |
| 2nd drawing | OK | OK | OK |
| 3rd drawing | OK | OK | OK |
| Sterilization resistance | OK | OK | dulling |
| 1ʰ/121° C. deionized water | 25 | 20 | 10 |
| Acetone test, double strokes | | | |
| on tinplate E1 | | | |
| Film thickness, µm | 5 | 5 | 5 |
| Crosshatch rating | 0 | 0 | 0 |
| Gloss, 60° angle | 90% | 80% | 70% |
| Deformability | | | |
| 1st drawing | OK | OK | OK |
| 2nd drawing | OK | OK | OK |
| 3rd drawing | OK | OK | OK |
| Sterilization resistance | OK | OK | dulling |
| 1ʰ/121° C. deionized water | 25 | 20 | 10 |
| Acetone test, double strokes | | | |

Film thickness:
  Determined using a commercial film-thickness meter, based on a magnetic system for tinplate and on an eddy current system for aluminum.
Crosshatch:
  Determined in accordance with DIN 53151. Rating scale from 0 (best value) to 5 (worst value).
Gloss:
  Determined using a commercially available instrument (based on the gloss of a polished black pane of glass).

Deformability:

Determined using the Erichsen multiple deep-drawing machine.

Sterilization resistance:

Determined in an autoclave in which the test specimens were completely immersed in deionized water; the pressure at 121° C. was 1.2 bar.

Acetone resistance:

A cotton wool pad impregnated with acetone is drawn in both directions over the coated surface under a load of 1000 g, over a path of 100 mm at uniform speed.

The test is terminated as soon as the first traces from wiping are discernible on the coated surface. The number given in the test consequently designates the number of double wipes after which there is still no discernible attack.

We claim:

1. An acid-modified polyester consisting of reaction products of educts selected from the group consisting of the following reactants (a) from 20 to 60 mol % of at least one dicarboxylic acid selected from the group consisting of oxalic, malonic, glutaric, adipic, pimelic, azelaic, sebacic, succinic, fumaric, maleic acid itaconic acid, 1,2-cyclohexandedicarboxylic acid, 1,3-cyclohexanedicarboxylic acid, 1,4-cyclohexanedicarboxylic acid, phthalic, terephthalic and isophthalic acid, 2,5-norbornanedicarboxylic acid, 1,4-naphthalene-dicarboxylic acid, biphenyldicarboxylic acid, 4,4'-sulfonyldibenzoic acid and 2,5-naphthalenedicarboxylic acid, and esters or anydrides thereof, (b) from 3 to 30 mol % of a dihydroxyalkanecarboxylic acid, (c) from 10 to 60 mol % of a diol selected from the group consisting of ethylene glycol, 1,2- and 1,3-propane diol, 2,2-dimethyl-1,3-propane diol, 1,3- and 1-4 butane diol, 1,5-pentane diol, 1,6-hexane diol, 2,2,4-trimethyl 1,6-hexane diol, 1,2-, 1,3- and 1,4-cyclohexane dimethanol, perhydrobisphenol A, p-xylylene diol, 2-ethyl and 2-butyl propane diol, (d) from 5 to 30 mol % of a polyalcohol having more than two OH groups selected from the group consisting of trimethylolpropane, trimethylolethane, glycerol, ditrimethylolpropane, pentaerythritol, dipentaeythritol, or a polycarboxylic acid having 3 to 6 carboxyl groups, and (e) from 0 to 20 mol % of a monocarboxylic acid selected from the group consisting of fatty acids of 10 to 18 carbon atoms, isovaleric acid and isooctanoic acid, the ratio of the sum of the hydroxyl equivalents to the sum of the carboxyl equivalents in the reactants being between 0.5 and 2.0, the quantities of free hydroxyl groups in the end product being between 30 and 350 mmol of hydroxyl groups per 100 g of solid resin, and the content of free, neutralized and/or neutralizable acid groups being between 5 and 340 mmol of acid groups per 100 g of solid resin wherein the polyester is prepared in a multi-step process, step 1 comprising the synthesis of a hydroxy-functional polyester, and step 2 comprising the reaction of the hydroxy-functional polyester with the dihydroxyalkane carboxylic acid (b) and further dicarboxylic acid (a).

2. A polyester as claimed in claim 1, which contains as component (b) dimethylolpropionic acid.

3. An acid-modified polyester of claim 1 containing 30 to 50 mol % of dicarboxylic acid.

4. An acid-modified polyester of claim 1 containing 5 to 20 mol % of dihydroxyalkanecarboxylic acid.

5. An acid-modified polyester of claim 1 containing 20 to 50 mol % of diol.

6. An acid-modified polyester of claim 1 containing up to 10 mol % of monocarboxylic acid.

7. An acid modified polyester of claim 1 containing 9 to 120 mmol of acid groups per 100 g of solid resin.

8. A stoving enamel containing as a binder an acid-modified polyester of claim 1.

9. An exterior packaging paint containing as a binder an acid-modified polyester of claim 1.

* * * * *